Oct. 21, 1924.
M. E. ROE
1,512,137
PROPELLING AND BRAKE MECHANISM FOR VELOCIPEDES
Filed Sept. 27, 1923   2 Sheets-Sheet 1
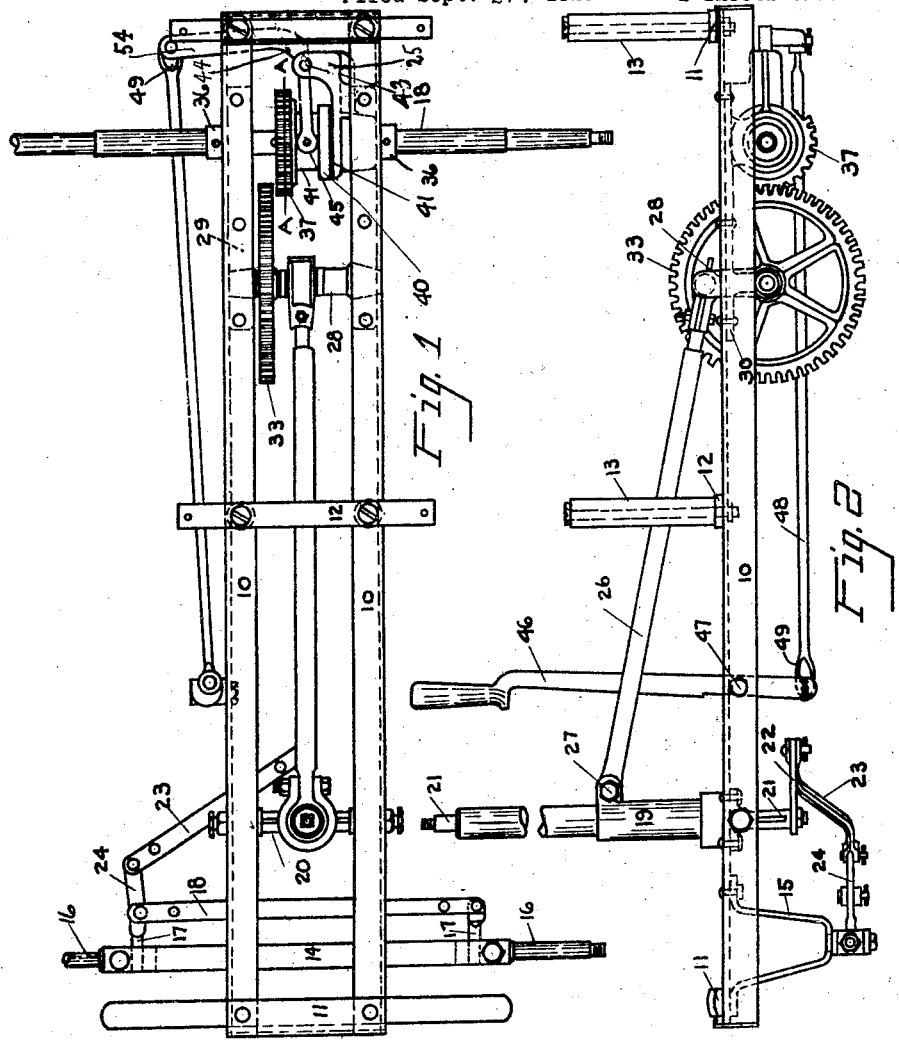
INVENTOR.
Mayo E. Roe
BY
Richey, Slough & Watts.
ATTORNEYS.

Oct. 21, 1924.

M. E. ROE 1,512,137

PROPELLING AND BRAKE MECHANISM FOR VELOCIPEDES

Filed Sept. 27, 1923    2 Sheets-Sheet 2

INVENTOR.
Mayo E. Roe
BY Richey, Slough & Watts.
ATTORNEYS.

Patented Oct. 21, 1924.

1,512,137

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

PROPELLING AND BRAKE MECHANISM FOR VELOCIPEDES.

Application filed September 27, 1923. Serial No. 665,218.

*To all whom it may concern:*

Be it known that I, MAYO E. ROE, a citizen of the United States, residing at Elyria, in the county of Lorain and State of Ohio, have invented certain new and useful Improvements in Propelling and Brake Mechanism for Velocipedes, of which the following is a specification.

This invention relates to mechanism for controlling the rotation of the driving axle of velocipedes, and similar vehicles.

The object of my invention is to simplify the mechanism employed to control the rotation of the driving axle, which includes a shiftable member which connects or disconnects the transmission with the axle, and applies a braking effect upon the axle when disconnected from the transmission.

Another object of my invention resides in the provision of a gear connector which is secured to rotate a driving axle, and which can be shifted to mesh with the transmission mechanism, to idle, or to engage a brake member.

Another object of my invention resides in providing structure for shifting the connector gear and for mounting the same.

These and other objects will appear hereinafter.

Figure 3:
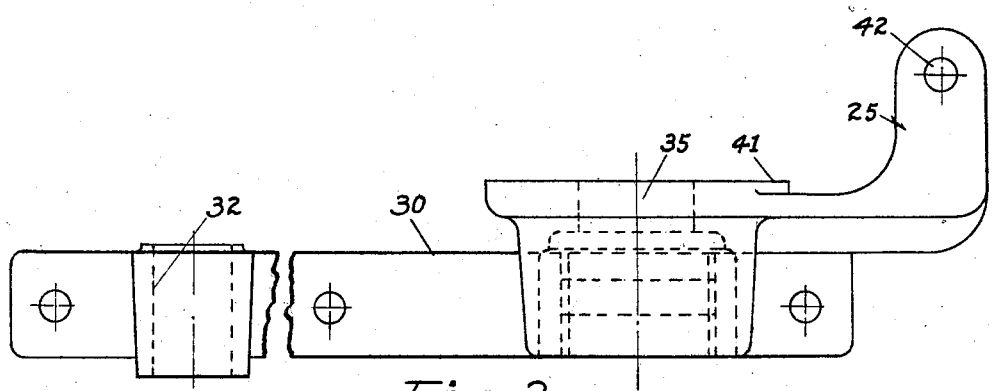
Figure 4:
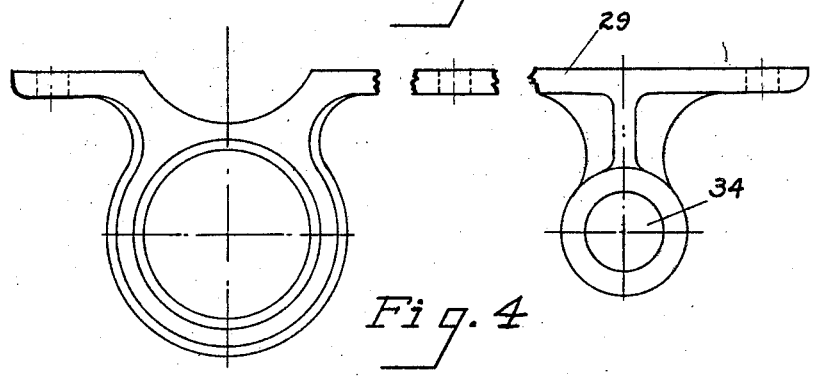
Figure 5:
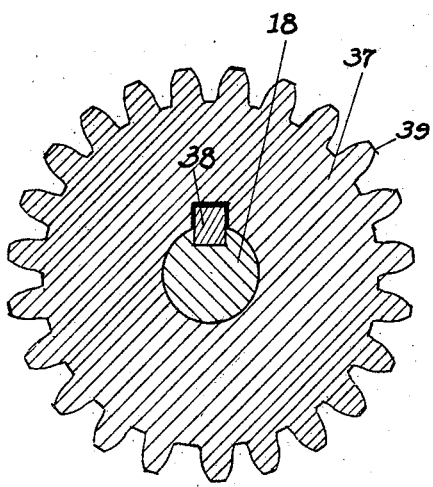

In the accompanying drawings, which illustrate an embodiment of my invention, Fig. 1 is a top plan view of a velocipede with the seat and wheels removed; Fig. 2 is a side elevation of the same; Fig. 3 is a top plan view of the brake member removed from the velocipede; and Fig. 4 is a side elevation of another bearing member used for supporting the transmission and rear axle; and Fig. 5 is a section taken on line A—A of Fig. 1 showing the connector gear slidably mounted upon the axle.

The frame construction, steering mechanism, and the propelling mechanism are substantially the same as shown in Patent 1,041,936 issued October 22nd, 1912, and reference may be had thereto for such details of construction which are not described herein.

Referring to the drawings by characters of reference, the main frame of the velocipede is formed of angle irons secured together, and consists of side members 10 and transverse end members 11. A transversely extending member 12 is secured substantially centrally across the side members of the frame. Upstanding posts 13 are secured upon the frame to support a seat thereabove, upon which the occupant sits.

A front axle 14 is secured by brackets 15 to the underside of the frame, and knuckles 16 are pivoted to the ends of the axle. Wheels are mounted upon the knuckles and links 17 are secured to the knuckles for turning the same to steer the vehicle, the links having a connecting rod 18 therebetween. A rear driving axle 18 is rotatably mounted in bearings secured to the rear end of the frame, and the ends thereof project beyond the sides of the frame and receive the rear wheels.

A tubular post 19 is pivotally mounted upon a cross shaft 20 which is secured across the side members of the frame, and a shaft 21 projects therethrough. The lower end of this shaft has a link 22 secured thereto, which is connected to the rod 18 by an arm 23 and a link 24. A hand wheel is secured to the upper end of the shaft 21, and by turning the hand wheel the occupant can operate the steering mechanism to turn the knuckles and wheels in the desired direction.

A rod 26 is pivotally secured at 27 to the tubular post 19, and extends rearwardly where it is secured to rotate a shaft 28.

Longitudinally extending bearing members 29 and 30, preferably of cast material, are secured to the under side of the angle iron side frame members 10, and the forward ends thereof are provided with aligned openings 31 and 32 in which the ends of the shaft 28 are rotatably secured. A transmission gear 33 is secured upon the shaft 28, and is rotated thereby. The propelling and transmission mechanism comprise the hollow post 19, the rod 26, the shaft 28, and the gear 33. Such mechanism is arranged to be operated by the occupant of the vehicle, and the same is accomplished by rocking the post back and forth longitudinally of the frame by the hand wheel, which is secured to the shaft extending through the post, whereby the rod 26 will be moved to rotate shaft 28 as shown in the above mentioned patent.

My invention, which I will now describe, can be used with the structure herein set forth, or with similar structures to which it may be adapted.

The bearing members 29 and 30 are provided with aligned transversely extending openings 34 and 35 respectively, through which the rear axle 18 is rotatably mounted. Suitable stops 36 are secured to the shaft adjacent the bearings to secure the shaft in place. The ends of the shaft carry the driving wheels on each side of the frame. A connector gear 37 is slidably secured upon and rotates the shaft 18, through the key 38 which is secured in a groove in the shaft. This arrangement causes rotation of the shaft, whenever the gear rotates, and permits the connector to slide back and forth relative to the shaft. The connector is provided with gear teeth 39 arranged to mesh with the transmission gear 33 when at one end of its sliding travel. The connector is also provided with a hub 40 extending from the gear portion thereof and a clutch yoke receiving groove 41 is provided therein.

The bearing 30 is provided with an inwardly extending brake hub 41 through which the rear axle extends and the end face thereof provides a surface against which the end surface of the connector hub is adapted to engage. By shifting the connector to the left, the engagement of the hubs provide a braking effect which controls the rotation of the gear connector, and consequently that of the shaft 18 to which it is secured.

A bracket 25 extends inwardly from the bearing member 30 at the rear of the brake hub and is provided with an opening 42 which receives a pin 43 for pivoting the bell crank lever 44 upon the bracket. The end of the bell crank lever is formed as a yoke 45 and engages the groove 41 in the connector hub, and the other end thereof projects beyond the side member of the velocipede frame. By means of the bell crank lever, the connector can be moved into mesh with the gear 33 to drive the shaft 18, or it can be moved against the brake hub, or it can be moved to an intermediate idling position between such positions.

A hand lever 46 is pivoted at 47 to the main frame, adjacent the post 19, and a link 48 is secured to the lever end thereof and to the projecting end 54 of the bell crank lever. The link 48 is provided with slots 49 at each end so that the relation in which it is secured to the hand lever and the bell crank lever, can be adjusted to regulate the throw of the bell crank.

When the lever 46 is pushed to its forward position the bell crank lever will move the connector gear into engagement with the transmission gear. When the lever is in vertical position, as shown in Fig. 1, the connector gear is in idle position between the transmission gear and the brake member. When the lever is moved rearwardly from its intermediate position, the end of the connector hub 40 will engage the brake hub 41. By thus controlling the rotation of the connector gear, when removed from the transmission gear, the rotation of the driving axle is also controlled, as the connector is keyed thereto, and the same is true when the connector gear is in mesh with the transmission.

It will be seen that I provide a single operating means which will move the connector into position whereby the axle can be rotated by power, can idly rotate, or a braking action can be applied thereto. It will also be observed that I have provided a single connector gear the position of which will provide one of the three relations just set forth, and also that a single member is used to provide a braking surface, and to serve as a bearing for the axle, and as a mounting for the connector operating lever.

Various changes in the details illustrated and described can be made without departing from the spirit and scope of my invention.

What I claim is:—

1. In a vehicle of the class described, the combination of a frame having a driving axle rotatably mounted therewith, transmission mechanism, a slidable connector secured to rotate said axle, means for shifting said connector lengthwise on said shaft into and out of driving engagement with said transmission mechanism, and means adapted to be engaged by said connector for controlling the rotation of said axle when said connector is disengaged from said transmission mechanism.

2. In a vehicle of the class described, the combination of a frame having a driving axle rotatably mounted therewith, transmission mechanism, a slidable connector secured to rotate said axle, means adapted to be directly engaged by said connector to brake the rotation of said axle, and means for shifting said connector on said shaft to engage said transmission mechanism or said brake means or to an intermediate position between said transmission mechanism and said braking means.

3. In a vehicle of the class described, the combination of a frame having a driving axle rotatably mounted therewith, transmission mechanism, a slidable connector secured upon said axle, a brake element secured to be directly engaged by said connector, and a single means for shifting said connector into or out of engagement with said transmission mechanism and said brake element, said brake element being positioned so that said connector will engage therewith when shifted to its extreme position away from said transmission mechanism.

4. In a vehicle, the combination of a frame having a driving axle secured therewith, a slidable gear secured to rotate said axle, transmission mechanism, means to slide said gear into and out of engagement with said transmission mechanism, and means engaged directly by said gear when moved out of engagement and away from said transmission mechanism to control the rotation of the axle.

5. In a velocipede, the combination of a frame having a driving axle rotatably secured therewith, a slidable gear secured to said axle, manually operated transmission mechanism, a bearing member having a brake element formed integrally therewith and arranged to be directly engaged by said connector when said connector is disengaged from said transmission mechanism, and a lever pivoted to said bearing, the continuous movement of which in opposite directions will shift said connector out of engagement with said transmission mechanism and from such position into engagement with said brake element and vice versa.

6. In a vehicle of the class described, the combination of a frame having a driving axle rotatably secured thereto, transmission mechanism, a shiftable connector secured to said axle, a brake element secured to said frame, said element having a face against which one end of said connector can be maintained to control the rotation thereof when disconnected from said transmission mechanism, a lever pivoted to said brake element and engaging said connector, and means for operating said lever to slide said connector into or out of engagement with said transmission mechanism or said brake element face.

7. The combination in a velocipede, a frame having a driving axle rotatably mounted therewith, mechanism adapted to be operated by the occupant of the velocipede, a shiftable gear for connecting and disconnecting the transmission with the axle, a brake element, a bell crank lever for shifting said gear into or out of engagement with said transmission and said brake element, a link secured to said lever, and a manually operated lever pivoted to said frame for moving said link and said bell crank lever to operate said connector.

8. In a velocipede, a frame, bearing members having aligned openings secured to said frame, a driving axle rotatably mounted in the openings in said bearings, transmission mechanism for driving said axle, one of said bearing members being formed with a brake hub and an apertured bracket, a connector gear keyed to slide upon said shaft, a bell crank lever pivoted to said bracket on the bearing and in engagement to shift said connector gear, and means for operating said bell crank lever to shift said gear into engagement with the transmission mechanism, in idle position, or against the brake hub formed with the bearing member.

In testimony whereof I hereunto affix my signature this 21st day of Sept., 1923.

MAYO E. ROE.